US007292681B2

(12) United States Patent
Pines

(10) Patent No.: US 7,292,681 B2
(45) Date of Patent: Nov. 6, 2007

(54) TECHNIQUE AND AN APPARATUS FOR PRODUCING POSTCARDS HAVING AN AUDIO MESSAGE FOR PLAYBACK BY RECIPIENT

(75) Inventor: Benjamin A. Pines, Rosly Heights, NY (US)

(73) Assignee: Apple Corporate Technologies, Inc., Floral Park, NY (US)

( * ) Notice: Subject to any disclaimer, the term of this patent is extended or adjusted under 35 U.S.C. 154(b) by 459 days.

(21) Appl. No.: 10/075,347

(22) Filed: Feb. 15, 2002

(65) Prior Publication Data

US 2003/0156686 A1 Aug. 21, 2003

(51) Int. Cl.
*H04M 1/64* (2006.01)

(52) U.S. Cl. .............................. 379/88.28; 379/88.07; 369/68; 455/558

(58) Field of Classification Search ............ 379/88.22, 379/88.28, 88.07, 357.02; 382/321; 369/68; 455/558
See application file for complete search history.

(56) References Cited

U.S. PATENT DOCUMENTS 5,063,698 A 11/1991 Johnson et al.
5,480,156 A 1/1996 Doederlein et al.
5,520,544 A 5/1996 Manico et al.
5,588,678 A 12/1996 Young
5,641,164 A 6/1997 Doederlein et al.
5,836,616 A 11/1998 Cooper et al.
5,855,001 A 12/1998 Doederlein et al.
5,938,199 A 8/1999 Doederlein et al.
6,283,367 B1 9/2001 Matthew et al.
6,292,780 B1 9/2001 Doederlein et al.
6,356,626 B1 * 3/2002 Ohara et al. ............. 379/88.22
6,421,470 B1 * 7/2002 Nozaki et al. .............. 382/321

FOREIGN PATENT DOCUMENTS

DE 3532259 3/1987
EP 0 034 024 8/1981
EP 0 277 276 8/1988
GB 2 244 454 12/1991
GB 2 264 898 9/1993
JP 04-226399 8/1992
JP 05-290594 11/1993
JP 09-202072 8/1997
JP 01-232097 9/1998

* cited by examiner

*Primary Examiner*—Gerald Gauthier
(74) *Attorney, Agent, or Firm*—Robert E. Bushnell, Esq.

(57) ABSTRACT

A system having a postcard having a thickness not to exceed 5.5 mm while containing an audio message for playback and a power supply, the system also having a base recording unit for recording a message to the postcard when the postcard is inserted into the base recording unit. The base recording unit has no power supply and draws power from the power supply on the postcard. The postcard is suitable for mailing using the postal service. The unit for recording is compact, has no power supply, is easily portable and is attractive. The card has a play-back button, a compact battery power source to drive play-back and recording of audio messages. The postcard is absent a record button allowing the postcard with an audio message to be sent through the postal system without the risk of accidental erasure of the recorded message. The card may be recorded and re-recorded when placed in the recording unit. The card contains an audio board that has an IC chip having memory for storing an audio message. The card and the recording unit are both absent a central processing unit.

33 Claims, 6 Drawing Sheets

TECHNIQUE AND AN APPARATUS FOR PRODUCING POSTCARDS HAVING AN AUDIO MESSAGE FOR PLAYBACK BY RECIPIENT

BACKGROUND OF THE INVENTION

1. Field of the Invention

A simple method and apparatus that enables a user to produce recordable messages on a postcard. The messages can be played back by a recipient of the postcard.

2. Description of the Related Art

The notion of recording a message on a card and sending the card through the postal system to a recipient for playback has always been present. Great Britain Publication No. 2,264,898A to Simmons teaches the production of greeting cards meant to be sent through the postal system to a recipient for future playback. These type of greeting cards could also have a space for writing a message, a space for a picture, and a button with a voice synthesizer to enable playback of a previously recorded message. FIG. 1 of this publication illustrates that the card 2 includes an EPROM 14, a voice play-back chip 16, a piezo speaker 18 and a battery 20. FIG. 2 of Simmons illustrates the recording unit 1. Recording unit 1 is made up of a central processing unit 4, DRAM 5, a number of switches and indicators 9 and 8 respectively, a microphone 10 and a test play-back speaker 11 as well as its own power source.

Nevertheless, the apparatus of Simmons contains many drawbacks. First, the recording unit 1 is bulky, heavy and requires its own power supply. Second, when a recording is made onto card 2, the recording cannot be changed. Therefore, if the user realizes that the recording on card 2 is unsatisfactory, the user cannot go back to recording unit 1 and re-record the card. Thus, Simmons teaches a "one-shot" recording on the greeting card (page 3, line 27 of Simmons). Furthermore, the system of Simmons requires a separate power source for the card and for the recording unit. This could add extra weight to the recording unit. The recording unit 1 comprises a CPU 4 which is an unnecessary expense and adds to the complexity of the system of Simmons. Also, Simmons uses a piezo speaker 18 which generates a very poor sound quality.

The prior art is replete with examples of greeting cards that do not require a base unit to record and later playback an audio message of a length of 20 seconds. For example, Japanese Publication No. 09-202072 discloses such a greeting card where the recording apparatus and the playback apparatus are all self-contained in a single greeting card. Switch 50 allows for playback of a previously recorded message through speakers 42. Also on the same card is a recording switch 32, a record button 34, a microphone 66 and an LED 36 that indicates when a message is being recorded. The drawback for these "all-in-one" greeting cards is inadvertent deployment of the recording switches and buttons while the greeting card is being mailed through the postal service. Furthermore, as such a card requires a lot of circuitry to both record and to playback, the weight and size of the card can become enormous.

EP 0,277,276A1 to Kondo illustrates another "all-in-one" greeting card 1 that contains a power source 10, microphone 7, three switches SW1, SW2 and SW3, a record/playback controller 30, speaker 8 and IC 30 (Toshiba T C8830). One common problem with cards that carry voice messages produced without the need of a separate recording unit is that the record button (SW3) may be accidentally pushed during mailing, destroying the message intended for the recipient. Kondo overcomes this by having a pin 20 illustrated in FIGS. 5A & 5B that, when removed, prevents the inadvertent recording of the card when placed with the postal system. Nevertheless, the card of Kondo is thick, heavy and fragile. A circuit board 4 is used in addition to bosses 5 and screws 6 making the card of Kondo less suitable for mailing than if the recording was to be accomplished by a separate recorder. Furthermore, the addition of features such as pin 20 complicates the recording and mailing process as the user must handle minute parts in order for the greeting card to work properly. Also, use of a small pin 20 deters one from reusing a single postcard in a later application.

What is needed is a simplified, easily portable, lightweight and attractive looking recording unit that can record messages on a postcard for later playback, the postcard having a thickness of only 5.5 mm. The recording unit is not to be too bulky or ugly, but instead, is rather small, lightweight and attractive enough to be placed on someone's desk. Furthermore, what is needed is a recording unit that has only one power supply, that power supply being in the card itself, overcoming the need for plugging into an electrical wall socket the base unit or the need to have a separate power supply for the base recording unit. What is also needed is a card capable of playing back an audio message while absent the possibility of having the message being accidentally erased when handled by the postal service. What is also needed is a device that can produce personalized, custom-made audio messages. Also, if the person recording deems the voice message stored on the card to be unsatisfactory, it is easily possible to record a new message on the card that overwrites the previous message. Therefore, what is needed is a recording unit that is powered by a battery inside the card during record and play-back.

SUMMARY OF THE INVENTION

It is therefore an object of the present invention to provide an improved apparatus and method for generating cards that contain a picture or writing in addition to a voice message.

It is another object of the present invention to provide an apparatus that allows for the recording and playback of personalized, custom audio messages.

It is also an object of the present invention to provide a recording apparatus for recording a voice message on a card where the recording apparatus is compact, highly portable, lightweight and attractive.

It is further an object of the present invention to provide a recording apparatus for cards for future playback where the recording apparatus is powered only by tiny batteries in the card.

It is yet another object of the present invention to provide a card that can playback messages and that the voice message can be overwritten if the voice message originally recorded on the card is deemed to be unsatisfactory.

It is yet also another object of the present invention to provide a card that can be mailed through the postal service to a recipient who can listen to a message by simply pushing a button on the card.

It is yet further an object to provide a recording device for recording voice messages for cards that can be mailed through the postal system that can produce voice messages on numerous cards.

It is further an object of the present invention to provide a postal card capable of playing back a message where the message cannot be accidently erased by an accidental actuation of a record button while being handled by the postal service.

It is still another object of the present invention to provide an audio postcard and a recording unit that are simple to use and operate.

It is yet another object of the present invention to be able to record 10 or 20 second audio messages on a 4 inch by 6 inch postcard having a thickness not exceeding 5.5 mm and the postcard having a weight not to exceed 1.5 ounces.

It is also yet another embodiment of the present invention to compartmentalize and compactly store all the circuit components within the postcard in a corner of the postcard to enable a user to be able to write easily on both surfaces of the postcard.

It is further an object of the present invention to provide a recording unit that is not more than 7.25 inches long, 4 inches high, weighs no more than 6.25 ounces, and does not have its own power supply adding to the portability of the recording unit.

These and other objects can be achieved by providing a recording apparatus that is absent a power source. The recording apparatus is powered by a tiny batteries found inside the card. The recording apparatus has a record button, a microphone, a recording LED that lights up during recording, and a slot to insert the card where the message is to be recorded. The slot has a plurality of pins to connect to the card where the recorded message is stored on. The recording unit is compact, lightweight and attractive, and looks similar to a nameplate on a person's desk.

The card includes a pair of lithium batteries, a speaker, a play button and a pin connector to electrically connect to the recording unit. The card also has an audio board having non-volatile, erasable memory such as an EEPROM to enable the sender to re-record the audio message if the user finds that the audio message currently on the card is unsatisfactory. Preferably, the sound card uses an ISD1100 series chip manufactured by Winbond, Inc. for a voice synthesizer but this application is not limited to using this type of chip. If an ISD 1100 series chip from Winbond, Inc. is employed, the EEPROM is included as part of the ISD 1100 series IC chip, the memory can store 10 or 20 seconds of an audio message, depending on the exact chip number. In one embodiment of the present invention, the speaker, the batteries and the playback button are all stored together on the audio board of the postcard with the memory and the voice synthesizer, the audio board of the postcard is then encased in plastic, and then both sides of the postcard are coated with a layer of vinyl allowing for reliable writing on all areas of both sides of the postcard.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PRESENT INVENTION

Figure 1:
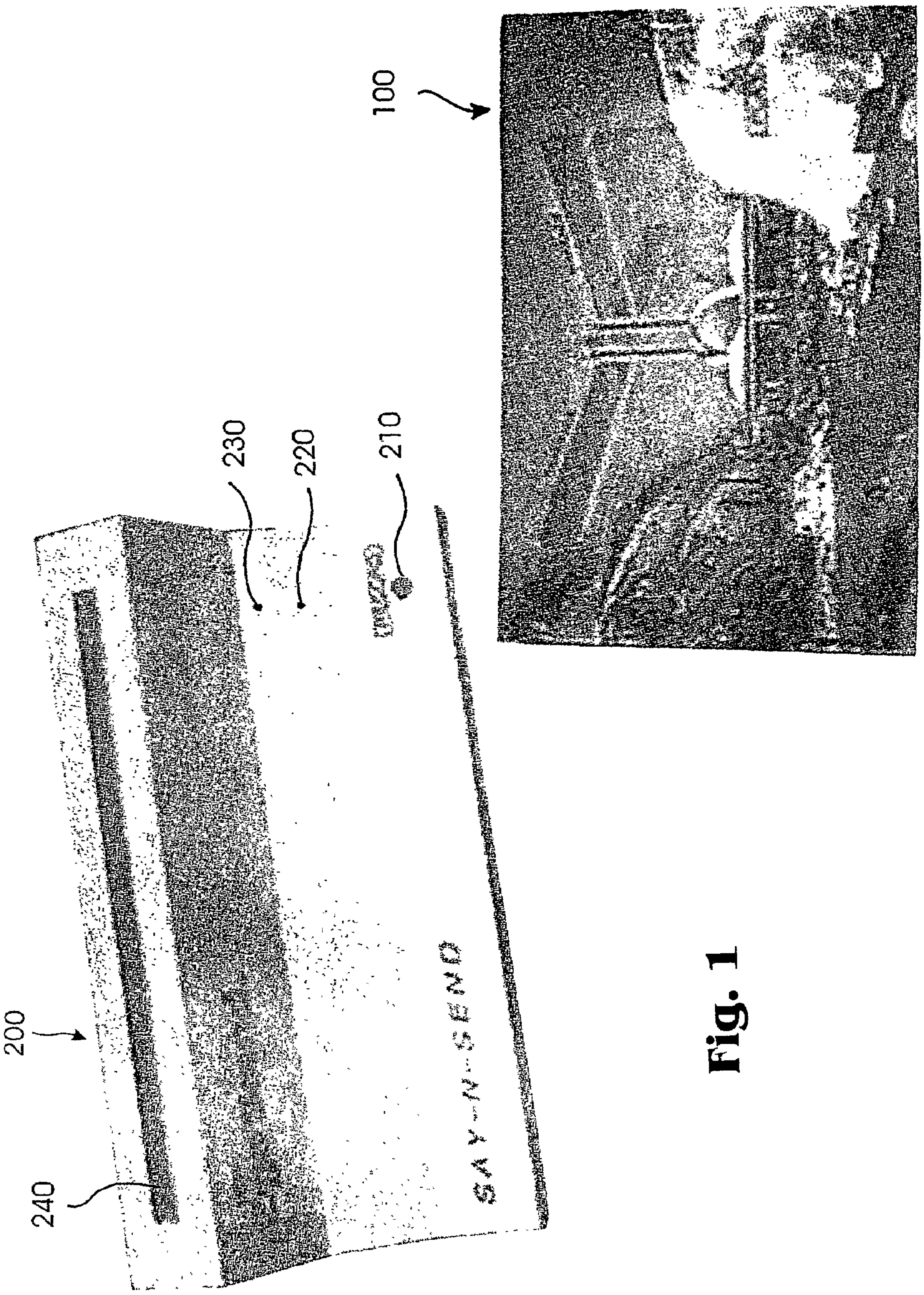
FIG. 1 is a plan view of a postcard having an audible message separated from the recording base unit according to the principles of the present invention

Turning to the figures, FIG. 1 is a plan view of the postcard 100 that contains an audible message and the recording unit 200. As can be seen, recording unit 200 is slightly longer than a is postcard. Recording unit 200 is compact, lightweight, and attractive looking. In the preferred embodiment, the size of recording unit 200 is 4 inches high, 7.25 inches across and 2.75 inches thick and weighs 6.25 ounces, making the recording unit easily portable. Thus, the recording unit 200 resembles a name plate on a person's desk as opposed to the bulky machine used in Simmons. Postcard 100 is a special kind of postcard as it contains a voice synthesizer that can play back an audible message when button 110 (not shown in FIG. 1) is pressed. Postcard 100 can be mailed through the postal system. In addition, postcard 100 may also have a picture 120 and a space for writing 130 on the back (not shown). In the preferred embodiment, the thickness of the postcard is 5.5 mm, has a weight of 1.35 ounces, and requires 57 cents U.S. postage for first class mailing with the United States Postal Service (USPS).

Recording unit 200 has a record button 210 to record a message onto a postcard 100 when postcard 100 is inserted into slot 240. In the preferred embodiment, the microphone 220 is an Electret condenser microphone that uses automatic gain control. The sender talks into microphone Wall 220 while pushing the record button 210 when the postcard is inserted into the recording unit. Recording unit 200 further has an LED 230 which lights up only during recording to let the user know that a recording is in progress.

Figure 2:
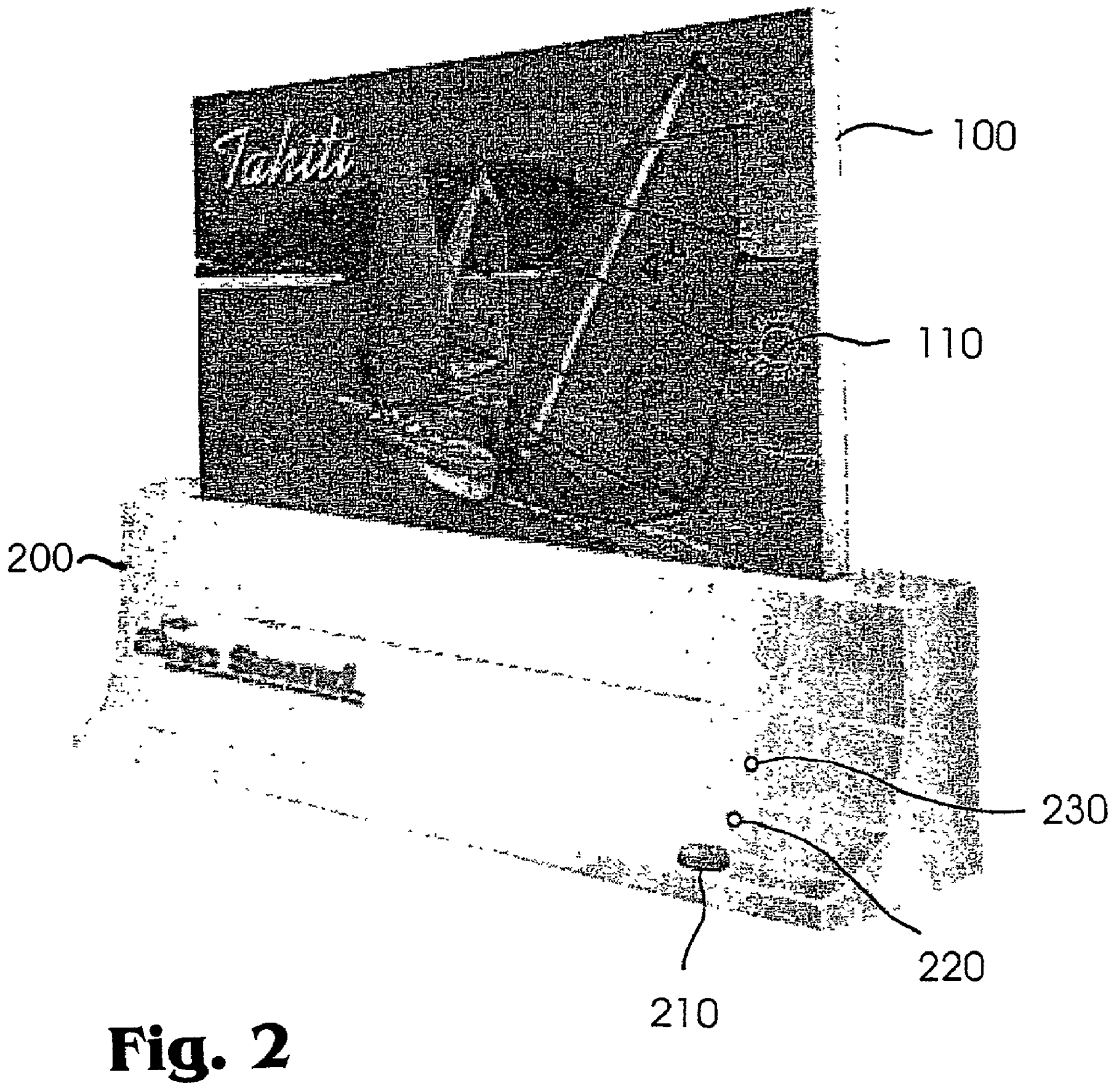
FIG. 2 is a plan view of the postcard of FIG. 1 inserted into the recording base according to the principles of the present invention.
Figure 3:
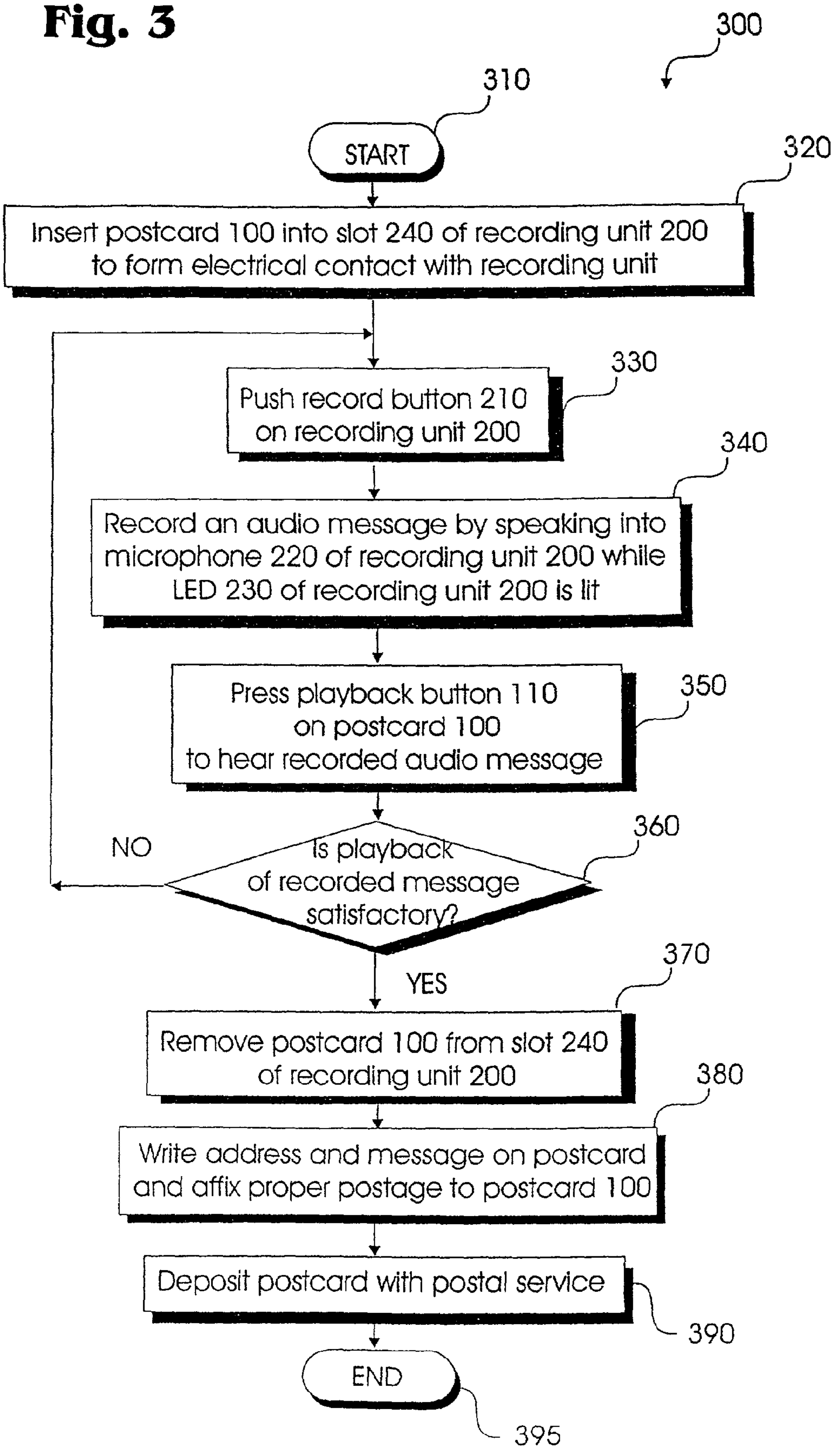
FIG. 3 is a flow chart illustrating the process for recording an audio message on a postcard according to the principles of the present invention.

FIG. 2 illustrates postcard 100 inserted into slot 240 of recording unit 200 to record a message onto card 100. FIG. 3 illustrates the process 300 for generating a postcard 100 with a satisfactory message recorded thereon. In FIG. 2, the playback button 110 is illustrated on the right side of postcard 100. When a user wishes to record a message onto card 100, the user first places the bottom of card 100 into slot 240 (Step 320) of recording unit 200. Then, the user pushes the record button 210 (Step 330). Upon pushing the record button, LED 230 lights up (Step 340). When LED 230 is lit, the user can record his message by speaking into microphone 220 on recording unit 200 (Step 340). Then the user plays back the message by pressing playback button 110 (Step 350). If the user is satisfied with the message (Step 360) played back, the user can remove (Step 370) the card 100 from the recording unit 200 and proceed to mail the card. If the user is dissatisfied (Step 360) with the message played back to him, the user can again press the record button 210 (Step 330) on recording unit 200 and re-record his message. When re-recording, LED 230 is again lit and the user speaks into the microphone 220 on the recording unit (Step 340). The act of re-recording overwrites the previous audio message stored in memory on card 100.

Thus, the user can re-record as many times as necessary until the message played back to him is satisfactory.

Figure 4:
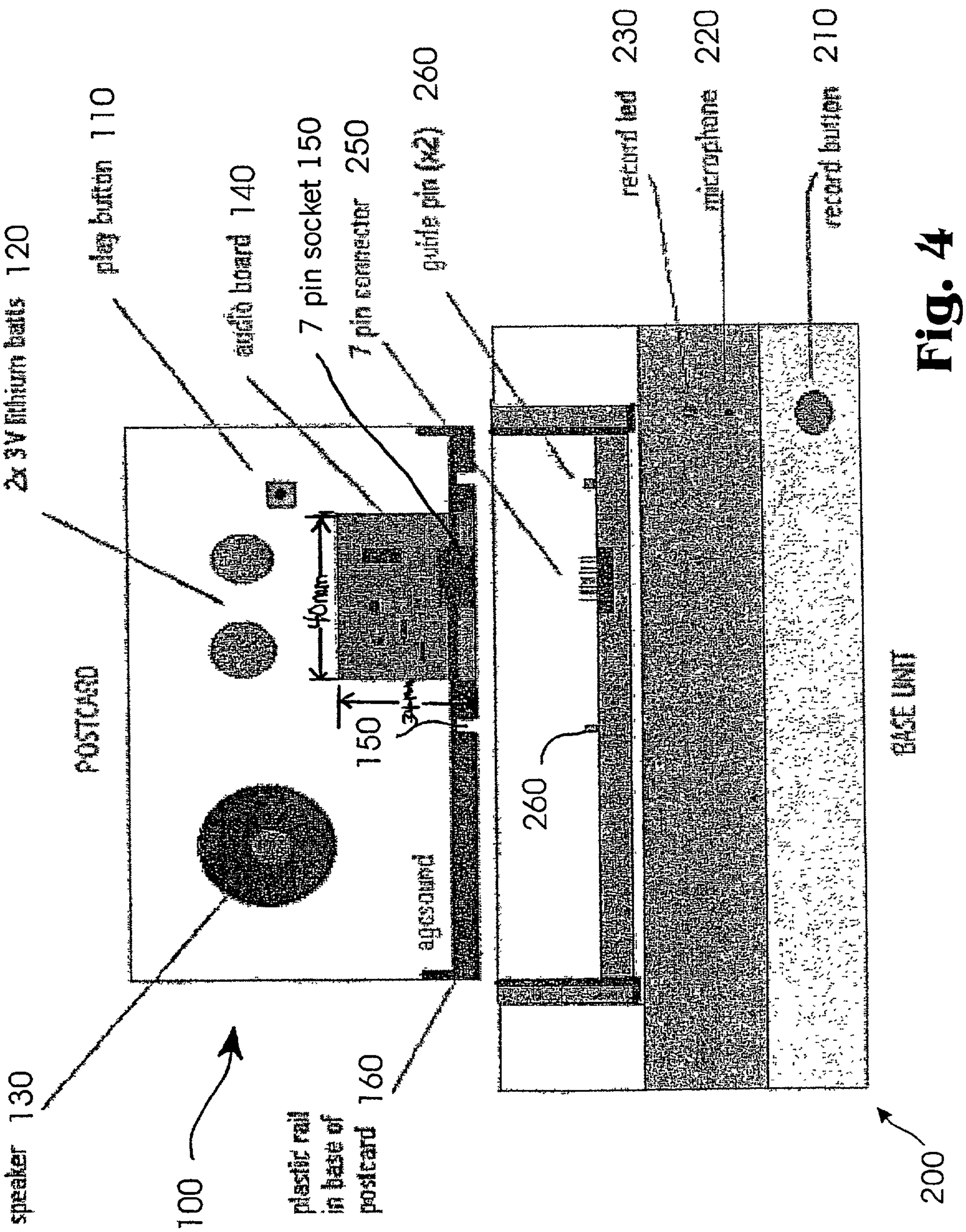
FIG. 4 is a view of the present invention illustrating the special relationships of electrical components according to one embodiment of the principles of the present invention.

FIG. 4 illustrates one embodiment of the layout the electronic components associated with the present invention. In this embodiment, postcard 100 has a playback button 110, lithium batteries 120 and speaker 130 are located outside of printed circuit card (PCB) or audio board 140 on postcard 100. Postcard 100 is inserted into recording unit 200 via slot 240 on the recording unit so that a plurality of pin sockets 150 on the postcard 100 mate with and electrically and mechanically connect to pin connector 250 on the base unit 200. In this embodiment, audio board 140 has dimensions of 40 mm by 34 mm and has a thickness of 4.5 mm. It is to be appreciated that the card 100 must be inserted so that plastic rail 160 found along one edge of card 100 is inserted into slot 240 of recording unit. Recording unit 200 has the record button 210, the microphone 220, the LED 230 a slot 240 for accommodating card 100, a set of electrical pin connectors 250 and guide pins 260. It is to be appreciated that recording unit is absent a power source. This is because when postcard 100 is placed within slot 240 and recording is in progress, batteries 120 power both the recording and the playback. Thus, recording unit 200 does not have to be plugged into an electrical socket in a wall and recording unit 200 does not have to have any batteries to power it because it is powered by the batteries 120 in the postcard 100. Recording unit 200 has a plurality of guide pins 260 that mate with guide sockets 150 along plastic rail 160 of card 100. Guide pins 260 and guide sockets 150 ordinarily to not form an electrical connection. Instead, they insure that electrical pin connector 250 physically line up with corresponding pin connectors on audio board 140 of card 100. Audio board 140 can comprise integrated circuit chips along with other electrical components to enable a voice to be recorded and played back. Generally, audio board 140 must contain a voice synthesizer and a memory for storing the audio message. Audio board 140 may be encased in plastic. Both sides of the entire postcard are coated in vinyl enabling an individual to write on all parts of the postcard. Audio board 140 is electrically connected to play button 110, batteries 120, speaker 130 on card 100 and audio board is electrically connected to pin connector 250 on the recording unit 200 via pin sockets 150 when card 100 is fully inserted into slot 240 of recording apparatus 200.

Figure 5:
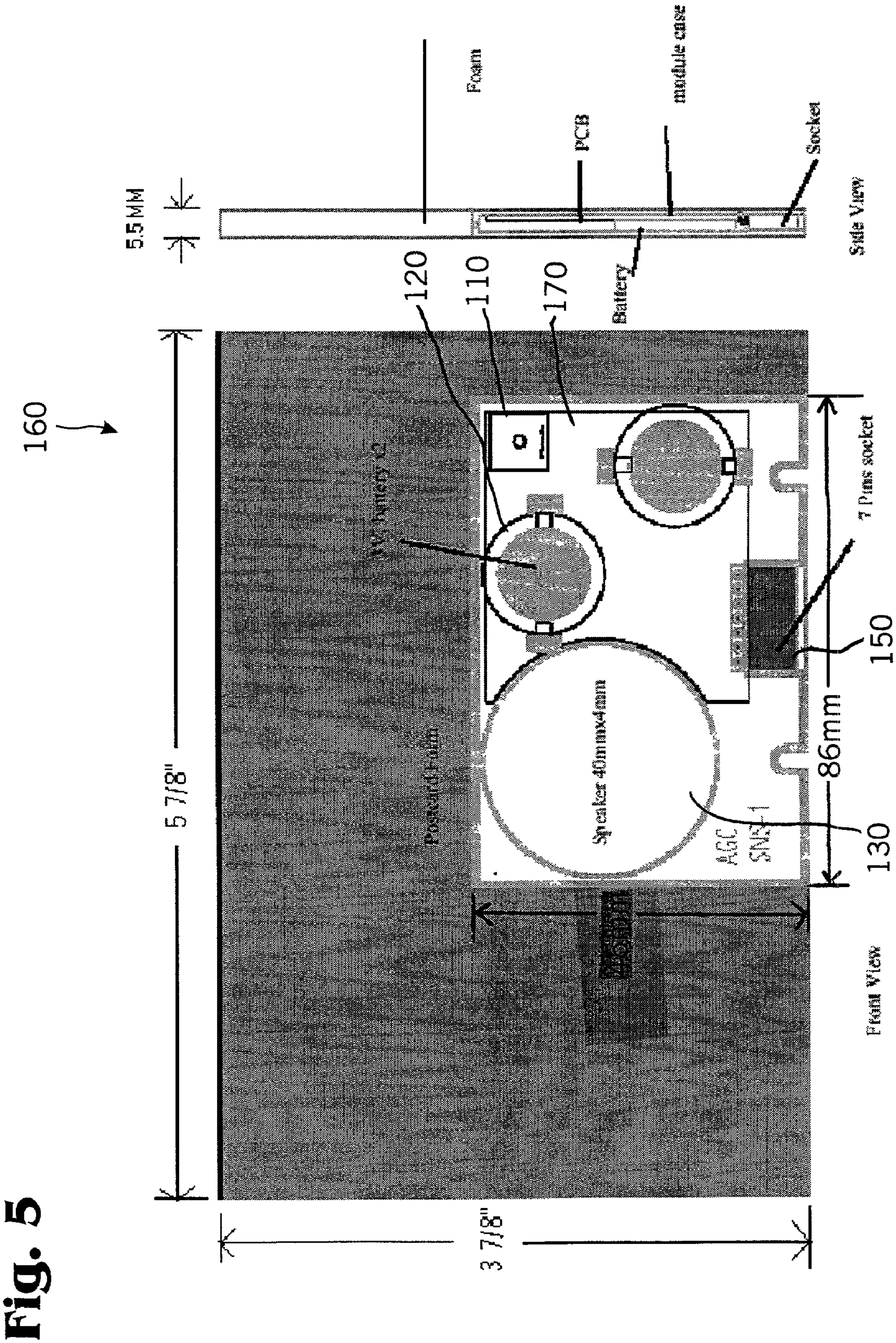
FIG. 5 is a view of the present invention illustrating the special relationships of electrical components on the postcard according to another embodiment of the present invention.

FIG. 5 illustrates front and side views of a much more advanced electrical layout for postcard 160. In FIG. 5, on PCB or audio board 170 are disposed speaker 130, batteries 120 and playback button 110 in addition to a voice synthesizer chip having memory. Speaker 130, batteries 120 and playback button 110 are all electrically connected on audio board 170 to a voice synthesizer chip and a memory. When postcard 160 is properly inserted into slot 240 of base unit 200, the circuitry on postcard 160 is electrically connected to record button 210, LED 230 and Electret microphone 220. In this embodiment, the dimensions of the audio board 170 are 86 mm by 45 mm and having a thickness of 5 mm. The circuitry of board 170 is encased in a plastic casing and is disposed near one corner of the postcard 160 having dimensions of less than 6 inches long and 4 inches high. A vinyl layer covers both sides of postcard 160 enabling an individual to write on both surfaces of the postcard 160. One advantage of this embodiment is that no air pockets are formed between the vinyl covering of the postcard where speaker 130 and batteries 120 were disposed, providing a smooth surface to write on in all places on both sides of postcard 160, the surfaces free of air gaps and voids generated by speaker 130 and batteries 120 in the embodiment illustrated in FIG. 4. Essentially, audio board 170 in this embodiment is similar in size and shape to a credit card.

Figure 6:
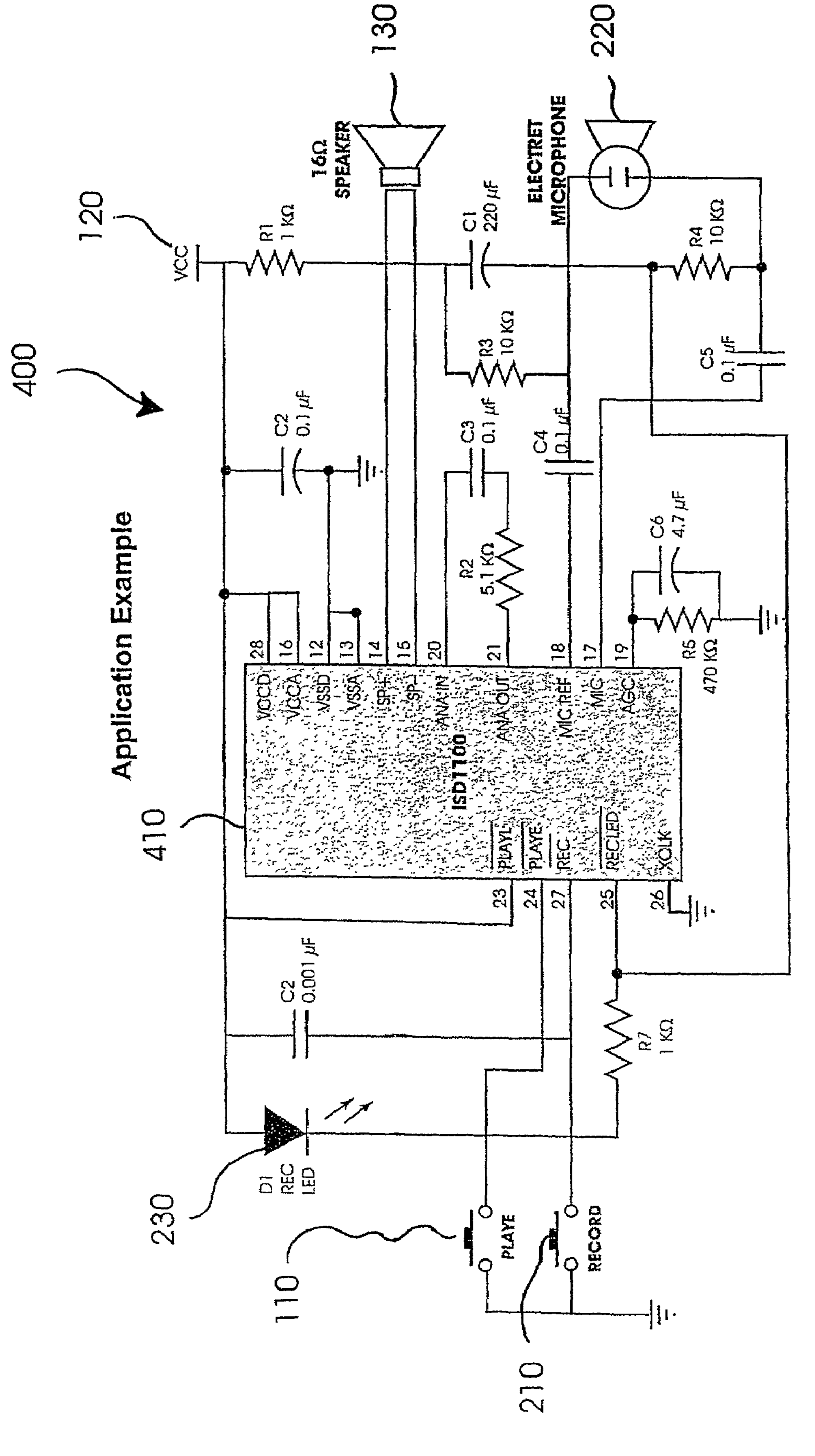
FIG. 6 is an electrical schematic of the circuit formed in the embodiments of FIGS. 4 and 5 when postcard is properly inserted into the slot of the recording unit according to the principles of the present invention.

Turning to FIG. 6, FIG. 6 illustrates an electrical schematic of the embodiments disclosed in FIGS. 4 and 5 when either postcard 100 or postcard 160 is properly inserted into slot 240 of recording apparatus 200. Although most of the circuitry of FIG. 6 can be disposed on audio board 140 or 170 of postcard 100 or 160 respectively, it is to be understood that FIG. 6 is an example of the electrical schematic of the entire invention when card 100 or 160 is fully inserted into slot 240 of recording unit 200 forming electrical contact between card 100 or 160 and recording unit 200. In the preferred embodiment, an ISD1100 series IC chip manufactured by Winbond, Inc. (hereinafter referred to as reference numeral "410") is used. As illustrated, circuit 400 is made up of parts from both the card 100 and the recording unit 200. The circuit 400 illustrates battery 120, speaker 130, playback button 110, LED 230, record button 210, microphone 220, IC chip 410 and other passive components such as resistors and capacitors. When an ISD1100 series IC chip from Winbond, Inc. is used on audio board 140 or 170 of card 100 or 160 respectively, an EEPROM is found within chip 410 that allows for a recording of a duration of 10 or 20 seconds depending on whether the chip is an ISD 1110 or an ISD 1120 chip, respectively from Winbond, Inc. As can be illustrated by circuit 400 in FIG. 6, circuit 400, unlike Simmons, is absent a microprocessor, central processing unit or a microcontroller. Furthermore, unlike Simmons, the memory found on chip 410 is EEPROM as opposed to EPROM, making the recording easily erasable or overwritten. In the preferred embodiment, two Lithium Ion batteries (3 volts each) are placed in series to generate Vcc of 6 volts for power supply 120 of circuit 400. It is to be appreciated that in the preferred embodiment, an ISD 1100 series IC chip from Winbond, Inc. is employed on audio board 140 or 170 of postcard 100 or 160 respectively to serve both as a voice synthesizer and an EEPROM and two Lithium Ion 3 volt batteries are employed as the power supply Vcc 120 for circuit 400, resulting in postcard 100 or 160 having a thickness that does not exceed 5.5 mm and a weight of 1.35 ounces for a 4 inch by 6 inch postcard necessitating a base recording unit that is 7.25 inches long, 4 inches high, 2.75 inches thick and having a weight of 6.25 ounces making base recording unit 200 easily portable while postcard 100 or 160 being made easily mailed.

Furthermore, an ISD 1100 series IC chip has to play input pins, a PLAYE or edge triggered play button and PLAYL for level activated play actuation. In the preferred embodiment, the PLAYE is used as the playback button 110. Since these play buttons are low-voltage activated, in the preferred embodiment, the PLAYL pin is tied to Vcc. When PLAYE pin is used for playback button 110, the play button need only be pushed once to playback a 10 or 20 second long audio message. It is to be appreciated that this invention could, instead use a PLAYL pin for the playback button 110, which would require the user to hold down the play button for the entire 10 or 20 second duration to playback a message.

It is to be appreciated that in the preferred embodiment, an ISD 1100 series IC chip from Winbond, Inc. is employed in audio board 140 or 170 of postcard 100 or 160 respectively. The ISD 1100 series chips have 8 address pins. In the preferred embodiment, these 8 address pins are tied to ground. When employed, the address pins allow for a selection of different audio messages having lengths less than the 10 or 20 second duration used in the preferred embodiment of the present invention.

In the preferred embodiment, when an ISD 1100 series Winbond, Inc. IC chip is employed on audio board 140 or 170 of postcard 100 or 160 respectively, the recording is accomplished in analog but the recording is digitally controlled. The card that is generated has a customized message as opposed to a mass produced factory generated message. Furthermore, when the recording of card 100 or 160 is finished, the user simply removes card 100 or 160 from slot 240 of recording unit 200 and mails it without worrying about the possibility that the recording made will be inadvertently destroyed or overwritten or without worrying about losing or keeping track of small parts as in Kondo.

Although the preferred embodiment uses a postcard 100 or 160 having a thickness of 5.5 mm and a size of 6 inches by 4 inches having a weight of 1.35 ounces and the recording unit has height of 4 inches, a length of 7.25 inches and a height of 2.75 inches, it can be appreciated that the present invention can be employed in other embodiments where the size of the postcard 100 or 160 is larger, resulting in the necessity of a larger sized recording unit 200.

While this invention has been particularly shown and described with reference to a preferred embodiment thereof, it will be understood by those skilled in the art that various changes in form and details may be made therein. Therefore, the true scope of the invention will be defined by the appended claims.

What is claimed is:

1. A sound producing display system, comprising:

a postcard capable of playing back a customized message, said postcard comprising:

a memory storing the customized message as an audio message;

a playback button borne by said postcard enabling a user to manually initiate playback of said audio message stored in said memory;

a speaker disposed to convert said audio message from said memory into audible sound:

a battery energizing said postcard and said system; and an audio board having an IC voice synthesizer chip attached thereto, said audio board being operationally connected to said system when said postcard is removably inserted into said system to accommodate recordation of the customized message in said memory.

2. The system of claim 1, further comprising:

a recording unit comprising:

a microphone recording the customized message onto said postcard;

a slot accommodating insertion of said postcard;

a plurality of electrical connectors forming an electrical contact to said postcard; and a record button to activate said microphone to allow the customized message to be recorded on said postcard.

3. The system of claim 1, said memory comprising an EEPROM being automatically overwritten by a subsequently recorded message.

4. The system of claim 1, said postcard being 5.5 mm thick and capable of being mailed through the postal service.

5. The system of claim 2, with said recording unit being absent a power supply when said postcard is not electrically connected to said system.

6. The system of claim 2, with said recording unit having a width less than 7.25 inches and a height of not more than 4 inches.

7. The system of claim 2, with said postcard having a plurality of guide slots to mate with corresponding ones of a plurality of guide pins on said recording unit so that a plurality of electrical fingers emanating from said audio board of said postcard mate with corresponding ones of said plurality of electrical connectors on said recording unit.

8. The system of claim 2, said recording unit further comprising an LED that turns on when said microphone is activated.

9. A method for recording a customized message on a recordable postcard, said method comprising the steps of:

inserting said postcard having a thickness less than or equal to 5.5 mm into a slot of a recording unit, said postcard forming electrical contact with said recording unit;

depressing a record button on said recording unit activating a microphone on said recording unit; and recording a first message onto said postcard by talking into a microphone disposed on said recording unit.

10. The method of claim 9, further comprising the steps of:

pressing a playback button on said postcard immediately after said recording step to listen to said first message stored in a memory on said postcard; and recording a second message onto said card by pressing said record button on said recording unit.

11. The method of claim 10, said second message overwrites said first message in said memory on said postcard.

12. The method of claim 9, further comprising the steps of:

pressing a playback button on said postcard immediately after said recording step to listen to said first message stored in a memory on said postcard; and removing said postcard from said recording unit if a user deems said first message is satisfactory.

13. The method of claim 11, further comprising the steps of:

pressing a playback button on said postcard immediately after said recording step to listen to said second message stored in a memory on said postcard; and removing said postcard from said recording unit if a user deems said second message is satisfactory.

14. A sound producing display system, comprising a postcard comprising:

a battery disposed to energize said postcard during playback of said audio message and energizing said recording unit during recording of said audio message;

a voice synthesizer;

a memory storing said audio message;

a plurality of electrical pin sockets that electrically attach to a recording unit;

a speaker producing audio signals based of said audio message stored in said memory; and a playback button that takes said audio message stored in said memory and produces audio sound by said speaker;

said postcard being less than 5.5 mm thick and having a length less than 6 inches and a height less than 4 inches and a weight less than 1.5 ounces.

15. The postcard of claim 14, said batteries, said voice synthesizer, said memory, said speaker, said playback button and said plurality of electrical pin sockets all being disposed on a printed circuit board (PCB) having a length less than 90 mm and a height less than 50 mm.

16. The postcard of claim 15, said PCB being encased with plastic, both sides of said postcard being covered with vinyl enabling a user to write messages on both sides of said postcard.

17. The postcard of claim 15, said memory being an EEPROM memory, said memory being overwritten each time a user records a new message, said EEPROM memory capable of storing audio messages having a duration of 20 seconds.

18. The postcard of claim 14, said memory being stored in a voice synthesizer IC chip, said memory enabling a user to record an audio message of 20 seconds, said postcard further comprising a printed circuit board having said voice synthesizer chip embedded therein, said playback button, said speaker and said batteries being disposed on said postcard away from said PCB, said speaker, said playback button and said batteries being electrically connected to said PCB.

19. The system of claim 14, comprising a vinyl layer covering major surfaces of said postcard and accommodating handwritten message.

20. The postcard of claim 15, further comprising:

a pair of vinyl layers, one being on each side of the postcard, the vinyl layers being adapted to allow a user to write a message thereon; and foam arranged on portions of a space between the vinyl layers absent the PCB.

21. A sound producing display system, comprising:

a postcard having a thickness not to exceed 5.5 mm, said postcard comprising:

a memory storing up to 20 seconds of an audio message;

a voice synthesizer chip connected to said memory;

a battery electrically connected to energize said system;

a speaker converting electrical signals into audible sound electrically connected to said voice synthesizer;

a plurality of electrical connectors disposed on an edge of said postcard to form electrical connection to a recording unit from electrical components in said postcard.

22. The system of claim 21, said voice synthesizer, said memory and said plurality of electrical connectors being disposed on a printed circuit board (PCB) having a dimension not to exceed 40 mm long and 35 mm high, said speaker, said playback button and said battery being disposed on said postcard at a distance from said PCB but being electrically connected to said PCB.

23. The system of claim 21, said voice synthesizer, said memory, said plurality of electrical connectors, said speaker, said playback button and said battery all being disposed on a printed circuit board (PCB) having a length not to exceed 90 mm and a height not to exceed 50 mm.

24. The system of claim 21, comprising:

said recording unit having a weight less than one-half of one pound, said recording unit electrically coupling to said postcard when said postcard is inserted into said recording unit, said recording unit comprising:

a microphone for storing audio sound into said memory;

a recording button enabling said microphone when pressed.

25. The system of claim 21, said recording unit being powered by said battery disposed in said postcard when said postcard is electrically connected to the recording unit.

26. The system of claim 21, said postcard being 4 inches by 6 inches and said postcard being 1.35 ounces in weight.

27. The system of claim 21, said memory being an EEPROM wherein each recording overwrites any previous recording stored in said EEPROM.

28. The system of claim 24, said recording unit being less than 7.25 inches long, 4 inches high and less than 3 inches thick, said postcard being 4 inches by 6 inches.

29. The system of claim 24, said recording unit having an LED that lights up during recordation of an audio message.

30. The system of claim 21, said battery comprising a pair of Lithium Ion 3 volt batteries being disposed in series.

31. The system of claim 22, said postcard being covered by vinyl enabling a user to write on both sides of said postcard.

32. The system of claim 23, with said postcard being covered by vinyl enabling a user to write on both sides of said postcard.

33. The system of claim 32, the postcard further comprising a foam layer arranged within the postcard underneath the vinyl in portions absent said PCB.

* * * * *